United States Patent
Wang

(10) Patent No.: US 9,418,277 B2
(45) Date of Patent: Aug. 16, 2016

(54) ELECTRONIC DEVICE AND METHOD FOR UNLOCKING THE ELECTRONIC DEVICE

(71) Applicant: Chiun Mai Communication Systems, Inc., New Taipei (TW)

(72) Inventor: Hsin-Wei Wang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/519,399

(22) Filed: Oct. 21, 2014

(65) Prior Publication Data

US 2015/0161433 A1   Jun. 11, 2015

(30) Foreign Application Priority Data

Dec. 11, 2013   (CN) .......................... 2013 1 0668709

(51) Int. Cl.
  G06K 9/00   (2006.01)
  G05B 19/00  (2006.01)
  G06F 21/32  (2013.01)

(52) U.S. Cl.
  CPC ............ *G06K 9/00087* (2013.01); *G06F 21/32* (2013.01)

(58) Field of Classification Search
  CPC ............ G06K 9/00087; G06K 9/0002; G06K 9/00026; G06K 9/00013; G06K 9/00067; G06F 21/32
  USPC ........... 382/100, 124, 115, 125, 305; 340/5.8, 340/5.2, 5.51, 5.52, 5.21, 5.22, 5.53, 5.81, 340/5.82, 5.83, 426.28; 715/700, 863
  See application file for complete search history.

(56) References Cited

U.S. PATENT DOCUMENTS

| | | | | |
|---|---|---|---|---|
| 5,748,765 | A * | 5/1998 | Takhar | G06K 9/00067 340/5.83 |
| 6,081,616 | A * | 6/2000 | Vaezi | G06K 9/00456 382/171 |
| 6,498,861 | B1 * | 12/2002 | Hamid | G06K 9/00087 340/5.52 |
| 7,127,088 | B1 * | 10/2006 | Grajewski | G06F 21/32 382/124 |
| 7,693,298 | B2 * | 4/2010 | Fukui | G06F 9/44505 382/100 |
| 7,715,593 | B1 * | 5/2010 | Adams | G06Q 20/327 340/5.53 |
| 8,218,734 | B2 * | 7/2012 | Bhupati | H04M 1/2478 235/382 |
| 2006/0267727 | A1 * | 11/2006 | Cayne | G07C 9/00087 340/5.22 |
| 2009/0222345 | A1 * | 9/2009 | Greene | G06Q 30/02 705/14.51 |
| 2009/0222349 | A1 * | 9/2009 | Burger | G06F 21/32 705/14.38 |
| 2010/0031043 | A1 * | 2/2010 | Burger | G06F 21/32 713/170 |

* cited by examiner

*Primary Examiner* — Sheela C Chawan
(74) *Attorney, Agent, or Firm* — ScienBiziP, P.C.

(57) ABSTRACT

A method for unlocking an electronic device stores a user fingerprint in a storage device and presets account information corresponding to each application for each of the user fingerprints. The method further receives fingerprint data input from the electronic device. When the received fingerprint data matches one of the user fingerprints, the account information corresponding to the matched fingerprint for each of the plurality of applications is confirmed. The method further replaces a default account information of each of the plurality of applications stored in the storage device by the confirmed account information corresponding to the matched fingerprint for each of the applications, and the electronic device is unlocked.

12 Claims, 3 Drawing Sheets a user of the electronic device 1 can input account information at a preset position on the preset user interface of each of the applications 10, and logs on each of the applications 10. The account information can include an account name and a corresponding password. Each of the applications 10 has a corresponding storage path in the storage device 12 for storing personal information of each of the applications 10. In at least one embodiment, the personal information can include default account information which is used to log on each of the applications 10 automatically when each of the applications 10 is activated to be executed. In other embodiments, the personal information can further include one or more groups of historical account information which are recorded in a history list when the electronic device 1 uses the historical account information to log on each of the applications 10.

ELECTRONIC DEVICE AND METHOD FOR UNLOCKING THE ELECTRONIC DEVICE

CROSS-REFERENCE TO RELATED APPLICATIONS

This application claims priority to Chinese Patent Application No. 201310668709.4 filed on Dec. 11, 2013, the contents of which are incorporated by reference herein.

FIELD

Embodiments of the present disclosure relate to device controlling technology, and particularly to an electronic device and method for unlocking the electronic device.

BACKGROUND

A user can use fingerprints to lock or unlock an electronic device (for example, a mobile phone). However, if the user lends the electronic device to another user, the user may need to clear personal information (for example, account names and passwords) for different applications after unlocking the electronic device. It is inconvenient for the user to clear the personal information for each application one by one manually.

BRIEF DESCRIPTION OF THE DRAWINGS

Implementations of the present disclosure will be described, by way of example only, with reference to the following drawings. The modules in the drawings are not necessarily drawn to scale, the emphasis instead being placed upon clearly illustrating the principles of the present disclosure. Moreover, in the drawings, like reference numerals designate corresponding portions throughout the views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references can mean "at least one," or "one or more."

In the present disclosure, "module," refers to logic embodied in hardware or firmware, or to a collection of software instructions, written in a program language. In one embodiment, the program language can be Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable media or storage medium. Non-limiting examples of a non-transitory computer-readable medium include CDs, DVDs, flash memory, and hard disk drives.

Figure 1:
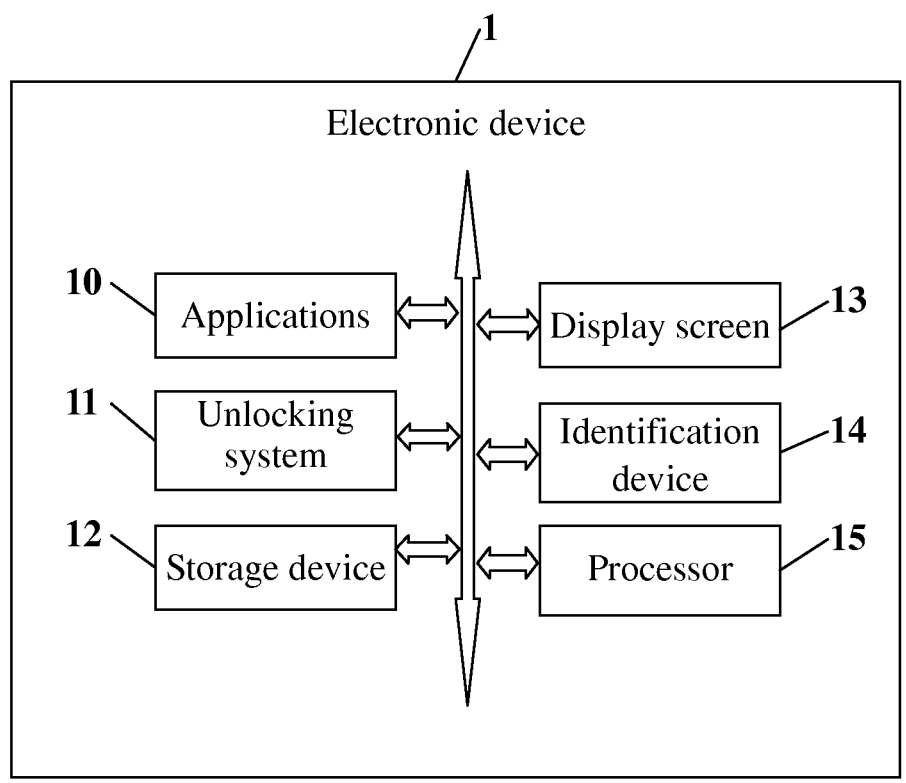
FIG. 1 is a block diagram of one embodiment of an electronic device including an unlocking system.

FIG. 1 is a block diagram of one embodiment of an electronic device including an unlocking system. In at least one embodiment, an electronic device 1 can be a mobile phone, a tablet computer, a notebook computer, or any other electronic device. The electronic device 1 includes, but is not limited to, one or more applications 10, an unlocking system 11, a storage device 12, a display screen 13, an identification device 14, and at least one processor 15. In other embodiments, the applications 10 can be stored in the storage device 12.

Each of the applications 10 has a preset user interface for logging on each of the applications 10. A user of the electronic device 1 can input account information at a preset position on the preset user interface of each of the applications 10, and logs on each of the applications 10. The account information can include an account name and a corresponding password. Each of the applications 10 has a corresponding storage path in the storage device 12 for storing personal information of each of the applications 10. In at least one embodiment, the personal information can include default account information which is used to log on each of the applications 10 automatically when each of the applications 10 is activated to be executed. In other embodiments, the personal information can further include one or more groups of historical account information which are recorded in a history list when the electronic device 1 uses the historical account information to log on each of the applications 10.

In at least one embodiment, the storage device 12 can be an internal storage system, such as a random access memory (RAM) for temporary storage of information, and/or a read only memory (ROM) for permanent storage of information. The storage device 12 can also be an external storage card, such as a smart media card or a secure digital card. The identification device 14 can collect and identify fingerprint data. When the display screen 13 is a touch screen, the identification device 14 can be integrated with the display screen 13 to identify the fingerprint data. The at least one processor 15 executes one or more computerized codes and other applications of the electronic device 1 to provide functions of the unlocking system 11.

In at least one embodiment, the unlocking system 11 can unlock the electronic device 1 when an input fingerprint is determined to match one of preset fingerprints, and protect the personal information of each of the applications 10 after unlocking the electronic device 1 according to the input fingerprint.

Figure 2:
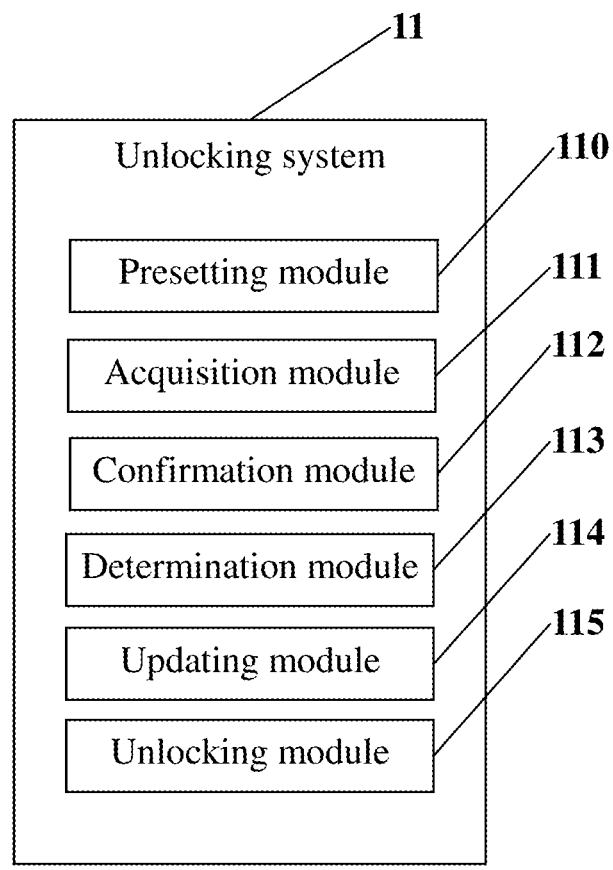
FIG. 2 is a block diagram of one embodiment of an unlocking system in the electronic device 1 of FIG. 1.

FIG. 2 is a block diagram of one embodiment of an unlocking system in the electronic device 1 of FIG. 1. In this embodiment, the unlocking system 11 can include a presetting module 110, an acquisition module 111, a confirmation module 112, a determination module 113, an updating module 114, and an unlocking module 115. The modules 110-115 include computerized code in the form of one or more programs that are stored in the storage device 12. The computerized code includes instructions that are executed by the at least one processor 15 to provide functions of the unlocking system 11.

The presetting module 110 stores a user fingerprint and a specified fingerprint in the storage device 12, and further presets account information corresponding to each of the applications 10 for the user fingerprint to be stored in the storage device 12. In at least one embodiment, the user of the electronic device 1 can store the user fingerprints and the specified fingerprint using the identification device 14. In at least one embodiment, the presetting module 110 can store first fingerprint data (for example, fingerprint data of forefinger) of an owner of the electronic device 1 as the user fingerprint, and store second fingerprint data (for example, fingerprint data of a thumb) of the owner of the electronic device 1 as the specified fingerprint. The first fingerprint data is different from the second fingerprint data. The user fingerprint can unlock the electronic device 1 and ensure each of the applications 10 to use the account information of the user fingerprint to log on automatically. The user fingerprint and the specified fingerprint can be fingerprint data of one or more fingers of the owner of the electronic device 1.

In other embodiments, the presetting module 110 can further store fingerprint data of one or more authorized users who are authorized to unlock and operate the electronic device 1 as the user fingerprints, and preset account information corresponding to each of the applications 10 for each of the user fingerprints to be stored in the storage device 12. The account information for each of the user fingerprints includes a specified account name and a specified password. The account information corresponding to different applications 10 can be the same or be different.

When the electronic device 1 is required to be unlocked, the acquisition module 111 receives fingerprint data from the identification device 14. In at least one embodiment, when the user starts to unlock the electronic device 1, the electronic device 1 can display a message for prompt the user to input the fingerprint data using the identification device 14.

The confirmation module 112 confirms a matched fingerprint from the preset finger print which matches the received fingerprint data. In at least one embodiment, the confirmation module 112 can compare the received fingerprint data with fingerprint data of all the stored fingerprints (including the user fingerprint and the specified fingerprint) in the storage device 12, and determines whether the received fingerprint data matches fingerprint data of one of the stored fingerprints. If the received fingerprint data is identical to the fingerprint data of one of the stored fingerprints, the received fingerprint data is determined to match the stored fingerprint, and the stored fingerprint is determined to be the matched fingerprint. If the received fingerprint data is different from the fingerprint data of all of the stored fingerprints, that is, no fingerprint stored in the storage device 12 is matched with the received fingerprint data, the electronic device 1 can prompt the user of the electronic device 1 to receive the fingerprint data again.

The determination module 113 determines whether the matched fingerprint is the user fingerprint or the specified fingerprint.

If the matched fingerprint is the specified fingerprint, the updating module 114 clears the personal information of each of the applications 10 stored in the storage device 12, and the unlocking module 115 unlocks the electronic device 1. Therefore, if the owner of the electronic device 1 wants to borrow the electronic device 1 to a stranger, the owner of the electronic device 1 can input the specified fingerprint to unlock the electronic device 1, and the personal information of each of the applications 10 can be protected.

If the match fingerprint is the user fingerprint, the confirmation module 112 confirms the account information corresponding to the matched fingerprint for each of the applications 10 from the storage device 12.

The updating module 114 replaces the default account information of each of the applications 10 stored in the storage device 12 by the confirmed account information corresponding to the matched fingerprint for each of the applications 10, and the unlocking module 115 unlocks the electronic device 1.

Figure 3:
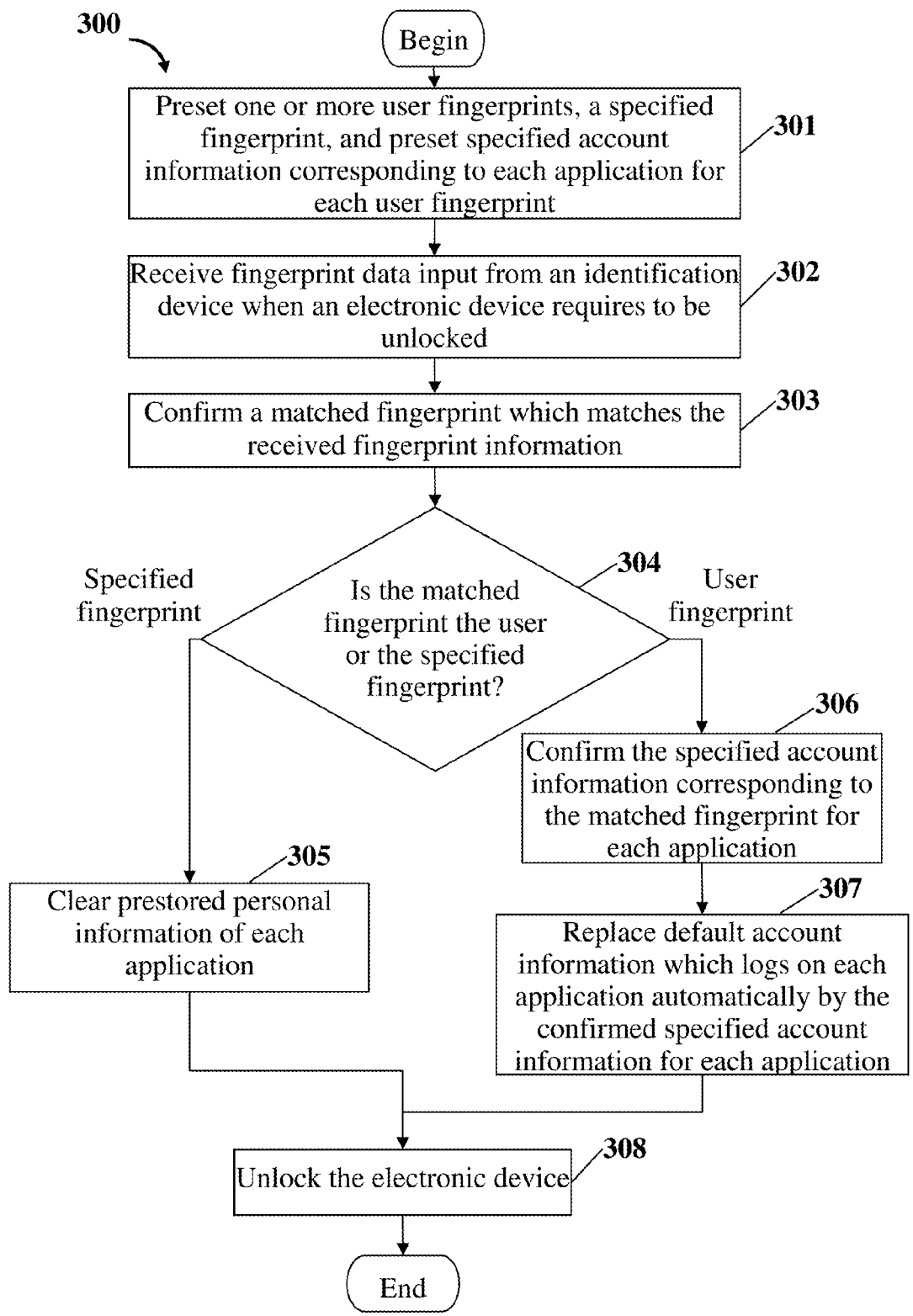
FIG. 3 is a flowchart of one embodiment of a method for unlocking the electronic device of FIG. 1.

FIG. 3 is a flowchart of one embodiment of a method for unlocking the electronic device of FIG. 1. In the embodiment, the method is performed by execution of computer-readable software program codes or instructions by at least one processor 15 of the electronic device 1. Referring to FIG. 3, a flowchart is presented in accordance with an example embodiment which is being thus illustrated. In the embodiment, the example method 300 is provided by way of example only as there are a variety of ways to carry out the method. The method 300 described below can be carried out using the configurations illustrated in FIG. 1-FIG. 2, for example, and various elements of these figures are referenced in explaining the example method 300. Each block shown in FIG. 3 represents one or more processes, methods or subroutines, carried out in the exemplary method 300. Additionally, the illustrated order of blocks is by example only and the order of the blocks can be changed according to the present disclosure. The exemplary method 300 can begin at block 301.

In block 301, the presetting module stores a user fingerprint and a specified fingerprint in the storage device 12, and further presets account information corresponding to each of the applications 10 for the user fingerprints to be stored in the storage device 12. In at least one embodiment, the user of the electronic device 1 can store the user fingerprint and the specified fingerprint using the identification device 14. The user fingerprint can be first fingerprint data of one or more fingers of an owner of the electronic device 1, and the specified fingerprint data can be second fingerprint data of one or more fingers of the owner of the electronic device 1 which is different from the first fingerprint data.

In other embodiments, the presetting module can further store fingerprint data of one or more authorized users who are authorized to unlock and operate the electronic device 1 as the user fingerprints, and preset account information corresponding to each of the applications 10 for each of the user fingerprints to be stored in the storage device 12. The account information for each of the user fingerprints includes a specified account name and a specified password. The account information corresponding to different applications 10 can be the same or be different.

In block 302, when the electronic device 1 is required to be unlocked, the acquisition module receives fingerprint data from the identification device 14. In at least one embodiment, when the user starts to unlock the electronic device 1, the electronic device 1 can display a message for prompt the user to input the fingerprint data using the identification device 14.

In block 303, the confirmation module confirms a matched fingerprint which matches the received fingerprint information according to the user fingerprints and the specified fingerprint stored in the storage device 12. In at least one embodiment, the confirmation module compares the received fingerprint data with fingerprint data of all the stored fingerprints in the storage device 12, and determines whether the received fingerprint data matches fingerprint data of one of the stored fingerprints. If the received fingerprint data is identical to the fingerprint data of one of the stored fingerprints, the received fingerprint data is determined to match the stored fingerprint, and the stored fingerprint is determined to be the matched fingerprint. If the received fingerprint data is different from the fingerprint data of all of the stored fingerprints, the electronic device 1 can prompt the user of the electronic device 1 to receive the fingerprint data again, and the procedure returns to block 301.

In block 304, the determination module determines whether the matched fingerprint is the user fingerprint or the specified fingerprint. If the match fingerprint is the user fingerprint, block 306 is implemented. If the matched fingerprint is the specified fingerprint, block 305 is implemented.

In block 305, the updating module clears the personal information of each of the applications 10 stored in the storage device 12, and block 308 is implemented.

In block 306, the confirmation module confirms the account information corresponding to the matched fingerprint for each of the applications 10 from the storage device 12.

In block 307, the updating module replaces the default account information of each of the applications 10 stored in the storage device 12 by the confirmed account information corresponding to the matched fingerprint for each of the applications 10.

In block 308, the unlocking module unlocks the electronic device 1, and the procedure ends.

All of the processes described above may be embodied in, and fully automated via, functional code modules executed by one or more general purpose processors such as the processor 15. The code modules may be stored in any type of non-transitory readable medium or other storage device such as the storage device 12. Some or all of the methods may alternatively be embodied in specialized hardware. Depending on the embodiment, the non-transitory readable medium can be a hard disk drive, a compact disc, a digital versatile disc, a tape drive, or other storage medium.

The described embodiments are merely examples of implementations, and have been set forth for a clear understanding of the principles of the present disclosure. Variations and modifications may be made without departing substantially from the scope of the present disclosure. All such modifications and variations are intended to be included within the scope of this disclosure and the described inventive embodiments, and the present disclosure is protected by the following claims and their equivalents.

What is claimed is:

1. A computer-implemented method for unlocking an electronic device, the electronic device comprising applications, the method comprising:
    storing a user fingerprint in a storage device of the electronic device;
    presetting account information corresponding to each of the applications for the user fingerprint;
    receiving fingerprint data inputted from the electronic device;
    when the fingerprint data matches the user fingerprint, confirming the account information corresponding to the user fingerprint for each of the applications;
    replacing a default account information for each of the applications stored in the storage device by the account information corresponding to the user fingerprint for each of the applications, and unlocking the electronic device;
    storing a specified fingerprint in the storage device; and
    clearing personal information of each of the applications prestored in the storage device and unlocking the electronic device when the received fingerprint data matches the specified fingerprint;
    wherein the personal information of each of the applications comprises the default account information which logs on each of the applications automatically when each of the applications is executed.

2. The method according to claim 1, wherein the user fingerprint comprises first fingerprint data of an owner of the electronic device, and the specified fingerprint comprises second fingerprint data of the owner of the electronic device which is different from the first fingerprint data.

3. The method according to claim 1, wherein each of the applications has a preset user interface for inputting account information to log on each of the applications.

4. The method according to claim 1, further comprising:
    storing fingerprint data of one or more authorized users who are authorized to unlock and operate the electronic device as the user fingerprints, and presetting account information corresponding to each of the applications for each of the user fingerprints to be stored in the storage device.

5. A non-transitory storage medium storing a set of instructions, when executed by at least one processor of an electronic device, the electronic device comprising applications, cause the at least one processor to perform a method for unlocking the electronic device, the method comprising:
    storing a user fingerprint in a storage device of the electronic device;
    presetting account information corresponding to each of the applications for the user fingerprint;
    receiving fingerprint data input from the electronic device;
    when the received fingerprint data matches the user fingerprint, confirming the account information corresponding to the matched user fingerprint for each of the applications;
    replacing a default account information of each of the applications stored in the storage device by the confirmed account information corresponding to the matched user fingerprint for each of the applications, and unlocking the electronic device;
    storing a specified fingerprint in the storage device; and
    clearing personal information of each of the applications prestored in the storage device and unlocking the electronic device when the received fingerprint data matches the specified fingerprint;
    wherein the personal information of each of the applications comprises the default account information which logs on each of the applications automatically when each of the applications is executed.

6. The storage medium according to claim 5, wherein the user fingerprint comprises first fingerprint data of an owner of the electronic device, and the specified fingerprint comprises second fingerprint data of the owner of the electronic device which is different from the first fingerprint data.

7. The storage medium according to claim 5, wherein each of the applications has a preset user interface for inputting account information to log on each of the applications.

8. The storage medium according to claim 5, wherein the method further comprising:
    storing fingerprint data of one or more authorized users who are authorized to unlock and operate the electronic device as the user fingerprints, and presetting account information corresponding to each of the applications for each of the user fingerprints to be stored in the storage device.

9. An electronic device, comprising:
    applications;
    at least one processor; and
    a storage device storing one or more programs, which when executed by the at least one processor, cause the at least one processor to:
    store a user fingerprint in a storage device of the electronic device;
    preset account information corresponding to each of the applications for the user fingerprint;
    receive fingerprint data input from the electronic device;
    when the received fingerprint data matches the user fingerprint, confirm the account information corresponding to the matched user fingerprint for each of the applications;
    replace a default account information of each of the applications stored in the storage device by the confirmed account information corresponding to the matched user fingerprint for each of the applications, and unlock the electronic device;
    store a specified fingerprint in the storage device; and clear personal information of each of the applications prestored in the storage device and unlocking the electronic device, when the received fingerprint data matches the specified fingerprint;

wherein the personal information of each of the applications comprises the default account information which logs on each of the applications automatically when each of the applications is executed.

10. The electronic device according to claim 9, wherein the user fingerprint comprises first fingerprint data of an owner of the electronic device, and the specified fingerprint comprises second fingerprint data of the owner of the electronic device which is different from the first fingerprint data.

11. The electronic device according to claim 9, wherein each of the applications has a preset user interface for inputting account information to log on each of the applications.

12. The electronic device according to claim 9, wherein the at least one processor further stores fingerprint data of one or more authorized users who are authorized to unlock and operate the electronic device as the user fingerprints, and presets account information corresponding to each of the applications for each of the user fingerprints to be stored in the storage device.

\* \* \* \* \*